(12) United States Patent
Conlon (10) Patent No.: US 8,465,387 B2
(45) Date of Patent: Jun. 18, 2013

(54) OUTPUT-SPLIT ELECTRICALLY-VARIABLE TRANSMISSION WITH TWO PLANETARY GEAR SETS AND TWO MOTOR/GENERATORS

(75) Inventor: Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 891 days.

(21) Appl. No.: 12/397,571

(22) Filed: Mar. 4, 2009

(65) Prior Publication Data
US 2010/0227722 A1 Sep. 9, 2010

(51) Int. Cl.
*F16H 3/72* (2006.01)
*F16H 37/06* (2006.01)

(52) U.S. Cl.
USPC ... 475/5; 180/65.23; 180/65.235; 180/65.275

(58) Field of Classification Search
USPC ............... 475/5; 180/65.22, 65.225, 65.23, 180/65.235, 65.24, 65.275, 65.6, 65.7
See application file for complete search history.

(56) References Cited

U.S. PATENT DOCUMENTS

| | | | |
|---|---|---|---|
| 7,108,087 B2 * | 9/2006 | Imai | 180/65.23 |
| 7,387,586 B2 * | 6/2008 | Raghavan et al. | 475/5 |
| 2008/0045365 A1 * | 2/2008 | Usoro | 475/5 |

* cited by examiner

*Primary Examiner* — Hau Phan
*Assistant Examiner* — Bryan Evans
(74) *Attorney, Agent, or Firm* — Quinn Law Group, PLLC (57) ABSTRACT

An electrically-variable transmission for use with an engine includes an input member configured for operative interconnection with the engine, an output member, and a stationary member. First and second motor/generators, a first and a second planetary gear set each having respective first, second, and third members are included. A first, a second, and a third selectively engagable torque-transmitting mechanism are included. The input member is connectable for common rotation with the first member of the first planetary gear set either continuously or selectively by engagement of the third torque-transmitting mechanism. The output member is connected for common rotation with the first member of the second planetary gear set. The motor/generators are controllable and the torque-transmitting mechanisms are selectively engagable to establish at least one electric-only mode, a series mode, an output-split mode, and at least one neutral mode.

17 Claims, 8 Drawing Sheets

OUTPUT-SPLIT ELECTRICALLY-VARIABLE TRANSMISSION WITH TWO PLANETARY GEAR SETS AND TWO MOTOR/GENERATORS

TECHNICAL FIELD

The invention relates to an electrically-variable transmission operable in an output-split mode and having two planetary gear sets and two motor/generators.

BACKGROUND OF THE INVENTION

Electrically-variable transmissions (EVTs) typically have an input member connected to an engine, as well as one or two motor/generators that are connected to different members of planetary gear sets to enable one or more electrically-variable modes of operation, fixed speed ratio modes, and an electric-only (battery powered) mode. An "electrically-variable" mode is an operating mode in which the speed ratio between the transmission input and output members is determined by the speed of one of the motor/generators.

EVTs may improve vehicle fuel economy in a variety of ways. For instance, the engine may be turned off at idle, during periods of deceleration and braking, and during periods of relatively low speed or light vehicle load operation to thereby eliminate efficiency losses incurred due to engine drag. Captured braking energy via regenerative braking, or energy stored by one of the motors acting as a generator during periods when the engine is operating, is utilized during these "engine off" periods to extend the period or duration during which the engine is off, to supplement engine torque or power, to operate the vehicle at a lower engine speed, and/or to supplement accessory power supplies. Transient demand for engine torque or power is supplemented by the motor/generators during "engine on" periods, allowing for downsizing of the engine without reducing apparent vehicle performance. Additionally, the motor/generators are very efficient in accessory power generation, and electric power from the battery serves as an available torque reserve allowing operation at a relatively low transmission speed ratio.

Electrically-variable modes may be classified as input-split, output-split, compound-split, or series modes. Input-split modes gear one motor/generator such that its speed varies in direct proportion to the transmission output, and the other motor/generator such that its speed is a linear combination of the input and output member speeds. Output-split modes have one motor/generator geared such that its speed varies in direct proportion to the transmission input member, and have the other motor/generator geared such that its speed is a linear combination of the input member and the output member speeds. A compound-split mode has both motor/generators geared such that their speeds are linear combinations of the input and output member speeds, but neither is in direct proportion to either the speed of the input member or the speed of the output member. A series mode has one motor/generator geared such that its speed varies in direct proportion to the speed of the transmission input member, and another motor/generator geared such that its speed varies in direct proportion to the speed of the transmission output member. There is no direct mechanical power transmission path between the input and output members when operating in series mode, and therefore all power must be transmitted electrically.

A series propulsion system is a system in which energy follows a path from an engine to an electric storage device, and then to an electrical motor/generator which applies power to rotate the drive members. In other words, there is no direct mechanical connection between the engine and the drive members in a series propulsion system, unlike parallel propulsion systems Existing EVT architectures are predominantly single mode input-split or two-mode. These architectures are not optimized for a plug-in hybrid application with a small engine and large battery where a large portion of operation is with engine off. For example, the single mode input-split requires that the output motor/generator be designed for the full vehicle speed range. The motor/generator thus may need to be designed to accommodate the high motor top speed in order to provide the desired motor strength and/or provide reasonable losses at top speed. A high system voltage (e.g., 600V) may also be required in order to make this system feasible. Motor/generator and transmission spin losses will tend to be relatively high in this type of system at high vehicle speeds, reducing highway fuel economy. A two-speed transmission may be used on the output motor to reduce the speed range of the motor/generator at the cost of increased mechanical complexity. A second source of increased losses when engine is off is that the input generator typically spins at several times output speed but is not usable for vehicle propulsion. Also, in a single mode input-split, a large percentage of the engine power flows through the electrical path at high engine speeds.

Two-mode architectures are not optimized for operating at high speed with engine off. The input motor (motor/generator A) may spin at several times the output speed with the engine off, but is not usable for propulsion, contributing to high spin losses and limiting the top speed of the vehicle with engine off. Powertrains with two-mode transmissions may also have a fixed gear as the synchronous point between first and the second electrically-variable modes. This requires that the engine speed must flare to the fixed gear synchronous speed when transitioning the engine from on to off or from off to on at high vehicle speeds. Also, the motor/generators are typically suited to be roughly equal in size, which makes it difficult to use a large amount of available battery power for responding to driver transient demand unless both motors are oversized.

SUMMARY OF THE INVENTION

Plug-in hybrid transmissions typically are utilized with a small engine and a large battery, and operate for a large portion of time with the engine off. An electrically-variable transmission is provided that specifically overcomes the disadvantages of existing plug-in hybrid electrically-variable transmissions given the small engine and large battery.

An electrically-variable transmission for use with an engine includes an input member configured for operative interconnection with the engine, an output member, and a stationary member. First and second motor/generators are included, as well as a first and a second planetary gear set, each having respective first, second, and third members. A first, a second, and a third selectively engagable torque-transmitting mechanism are included. The input member is connectable for common rotation with the first member of the first planetary gear set either continuously or selectively by engagement of the third torque-transmitting mechanism. The output member is connected for common rotation with the first member of the second planetary gear set. The first motor/generator is connected for common rotation with the second member of the first planetary gear set. The second motor/generator is connected for common rotation with the second member of the second planetary gear set. The third member of the first planetary gear set is grounded to the stationary member in at least one direction of rotation via a first one-way clutch, or continuously. The third member of the second planetary gear set is selectively grounded to the stationary member by engagement of the first torque-transmitting mechanism. The third member of the second planetary gear set is selectively connectable for common rotation with one of the members of the first planetary gear set by engagement of the second torque-transmitting mechanism. The motor/generators are controllable and the torque-transmitting mechanisms are selectively engagable to establish at least one electric-only mode, a series mode, an output-split mode, and at least one neutral mode. In some embodiments where a first one-way clutch grounds the third member of the first planetary gear set to the stationary member, a second one-way clutch may be included to provide reaction torque to the first member of the first planetary gear set when the second torque-transmitting mechanism is engaged and both motor/generators are providing driving torque in a two-motor electric-only mode. In some embodiments where the third member of the first planetary gear set is grounded to the stationary member continuously, a one-way clutch may be connected between the input member and the first motor/generator to enable the engine to be started by the first motor/generator without closing any of the other clutches.

Each of the various embodiments has at least some of the following advantages: (i) no hydraulic clutches need to be closed in order to start the engine; enabling improved cold start performance; (ii) required torque to crank the engine at cold start conditions is decreased due to a favorable gear ratio rather than direct drive; (iii) improved generator efficiency is realized due to increased motor speed; (iv) seamless, zero energy shifts are possible between series and load-sharing modes with or without full battery power available; and (v) there is an increased tractive capability in the load-sharing (i.e., output-split mode) relative to existing designs due to the gear ratio between the first motor/generator and the engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
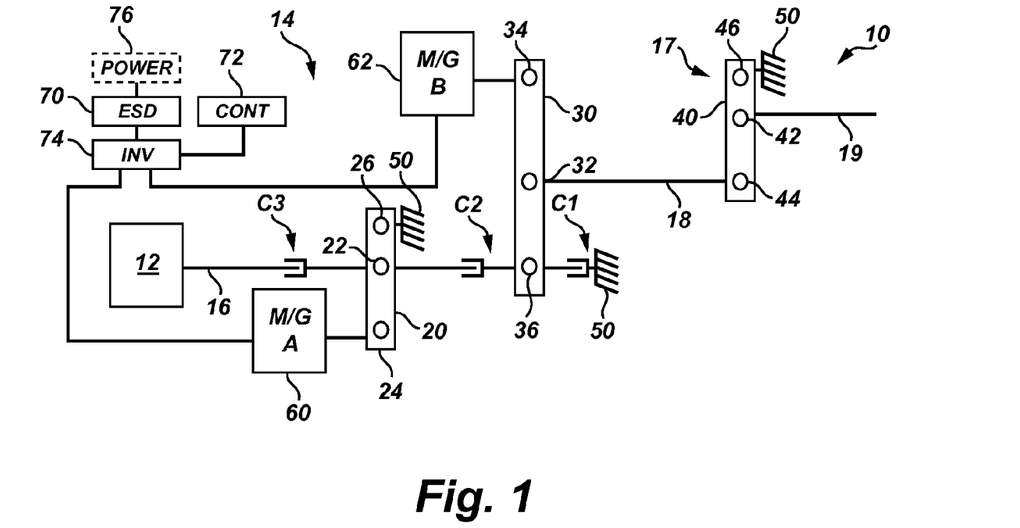
FIG. 1 is a schematic illustration of a first embodiment of an electrically-variable transmission in lever diagram form.

Referring to the drawings, wherein like reference numbers refer to like components throughout the several views, FIG. 1 illustrates a hybrid powertrain 10 having an engine 12 connected to an electrically-variable transmission 14. Transmission 14 is designed to receive at least a portion of its driving power from engine 12 in a plurality of its various operating modes, as discussed below. The transmission 14 is applicable to either front wheel-drive (FWD) transverse or rear wheel-drive (RWD) longitudinal layouts.

Engine 12 has an output shaft or member that serves as an input member 16 of transmission 14. A final drive unit or assembly 17 is operatively connected to an output shaft or member 18 of transmission 14 for providing power to a final drive 19.

Transmission 14 includes a first planetary gear set 20 represented as a three-node lever having a first member 22, a second member 24, and a third member 26, which are represented as nodes. As with all levers shown and described with respect to the various embodiments of powertrains herein, the members may be a ring gear member, a sun gear member, and a carrier member, although not necessarily in that particular order. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever, members of other planetary gear sets which appear as nodes on another lever, a stationary member 50 such as a transmission case, and other transmission members, such as input member 16 or output member 18.

Transmission 14 includes a second planetary gear set 30 represented as a three-node lever having a first member 32, a second member 34, and a third member 36, which are represented as nodes.

The final drive assembly 17 is a planetary gear set 40 represented by a three-node lever having a first member 42, a second member 44 and a third member 46. Alternatively, the final drive assembly may be one or more parallel shaft gear sets (not shown), and/or a chain transfer mechanism (not shown).

Transmission 14 has multiple interconnections. A rotor of motor/generator 60 (also referred to as M/G A) is continuously connected with the second member 24 of planetary gear set 20 for common rotation therewith. The third member 26 is grounded to stationary member 50. First member 32 of planetary gear set 30 is continuously connected to output member 18 for common rotation therewith. Second member 34 is continuously connected with another motor/generator 62 (also referred to as M/G B) for common rotation with a rotor therewith. First member 42 is continuously connected with final drive 19. Second member 44 is continuously connected with output member 18. Third member 46 is continuously connected with stationary member 50.

Transmission 14 also has several selectively engagable torque-transmitting mechanisms that provide various vehicle operating modes, as described below. Torque-transmitting mechanism C1, referred to hereinafter for simplicity as brake or clutch C1, is selectively engagable to ground third member 36 to stationary member 50. Torque-transmitting mechanism C2, also a rotating clutch and referred to hereinafter for simplicity as clutch C2, is selectively engagable to connect first member 22 to third member 36. Torque-transmitting mechanism C3, which is a rotating clutch referred to hereinafter for simplicity as clutch C3, is selectively engagable to connect input member 16 with first member 22.

Powertrain 10 preferably has an onboard energy storage device 70, abbreviated ESD 70 hereinafter for simplicity, that is operatively connected to each of the respective motor/generators 60, 62 such that motor/generators 60, 62 may selectively transfer power to or receive power from ESD 70. As used herein, an "onboard" energy storage device is any energy storage device that is mounted on the vehicle (not shown) to which powertrain 10 with motor/generators 60 and 62 is also mounted. ESD 70 may be, for example, one or more batteries or battery packs. Other onboard energy storage devices, such as fuel cells or capacitors, which have the ability to provide, and/or store and dispense, sufficient electric power may be used in combination with or in place of batteries.

An electronic control unit or controller 72, labeled CONT is operatively connected to ESD 70 to control the distribution of power to or from ESD 70 as needed. Operating data gathered by sensors, such as the speed of input member 16 and output member 18, may be provided to controller 72 as well, for various uses, such as when operating in a regenerative braking mode. As will be understood by those of ordinary skill of the art, regenerative braking capability may be accomplished by using controller 72 to balance torque from engine 12, from motor/generator 60 (M/G A), and from motor/generator 62 (M/G B) during braking to provide the desired deceleration rate of output member 18.

ESD 70 is preferably connected to a DC-to-AC power inverter 74, labeled INV, and is also preferably configured to be rechargeable by an offboard power supply system 76, labeled POWER, when used with a plug-in hybrid vehicle. As used herein, an "offboard" power supply is a power supply that is not mounted on the vehicle (not shown) with powertrain 10, is not integral with transmission 14, and is operatively connected to ESD 70 only during recharging thereof, such as would occur in a plug-in hybrid vehicle application. Different offboard power supply systems that establish connectivity between ESD 70 and an offboard power supply system 76 for recharging of ESD 70 may be used, as will be understood by those skilled in the art. For example, a system with an offboard charger, a conductive interface and an onboard rectifier may be used, a system with an offboard inductive charger, an inductive interface and an onboard rectifier, or a system with a plug-type interface and an onboard charger.

The hybrid powertrain 10 is operable according to the clutch engagement schedule of Table I along with control of the motor/generators 60, 62 and the on or off state of the engine 12 to provide five operating modes.

TABLE I

| Clutch C1 | Clutch C2 | Clutch C3 | Mode |
|---|---|---|---|
| X |   | X | One-motor electric-only (EV) (engine off)/Series (engine on) |
|   | X | X | EVT/Load-sharing (output-split) |
|   |   |   | Neutral |
|   |   | X | Neutral with Battery Charge |
|   | X |   | Two-motor electric-only (EV) |

With the vehicle at rest, the powertrain 10 is in the one-motor EV mode. Motor/generator B 62 is used to launch the vehicle. The vehicle may be driven electrically with motor/generator B 62. The top speed of the vehicle in EV and series mode is limited by the maximum speed of motor/generator B 62. The vehicle may also be braked using motor/generator B 62. A key benefit of this transmission 14 is that there are no slipping clutches when the vehicle is operated in a one-motor EV mode, maximizing efficiency in this mode. One-motor EV operation and series operation require the same engaged clutches (i.e., the same mode) and are usable at low vehicle speeds or high vehicle loads. This mode may be operated with the engine on (series mode) or off (one-motor EV mode).

Neutral is a mode which disconnects motor/generator B 62 from the output. If clutch C3 is closed while in neutral, the motor 60 is connected to the engine to enable charging of the energy storage device 70.

At high vehicle speeds, motor/generator B 62 will be at high speeds in the one-motor EV mode. This may result in inefficient operation at light loads for some types of motors. To reduce motor losses or to reduce motor/generator B 62 speed for other reasons, the system may be operated in two-motor EV mode. To transition from one-motor EV to two-motor EV mode, clutch C3 is opened, then clutch C1 is opened while C2 is closed and torque is commanded on motor/generator A 60 to react motor/generator B 62 torque. Motor/generator A 60 is then accelerated to a speed which provides a desirable ratio of power between motors A 60 and B 62 and/or minimizes losses between the motors 60, 62. Since the torques of motor/generator A 60 and B 62 are both proportional to output torque, the ratio of motor/generator A 60 speed to motor/generator B 62 speed determines the power allocation between the motors 60, 62. This mode is also useful for sharing the losses between motors A and B 60, 62, providing improved continuous power capability since cooling is performed over two motors rather than one yielding greater cooling capability. Two-motor EV mode allows both motor/generators 60, 62 to react a portion of vehicle propulsion torque, allowing the speed of the motor/generators 60, 62 to be varied in order to split the power between motors A and B and to minimize motor and transmission losses.

If it is desired to start the engine 12 while in one-motor EV mode, positive torque is commanded on motor/generator A 60 causing the engine 12 to increase speed in the positive direction. Once the engine 12 reaches operating speed, it begins to produce torque. Motor/generator A 60 can then transition to negative torque acting as a generator to operate the system in series mode. In series mode, the engine 12 drives the motor/generator A 60, which acts as a generator and powers motor/generator B 62 through the energy storage device 70, and inverter 74 under the control of controller 72. Since motor/generator B 62 is capable of meeting the full tractive needs of the vehicle, maximum flexibility is allowed for engine or catalyst warm-up in order to maximize fuel economy and minimize cold start emissions.

If it is desired to start the engine 12 while in two-motor EV mode, the powertrain 10 may be transitioned directly to output-split mode by closing clutch C3, causing the engine 12 to start. Alternately, the powertrain 10 may be shifted synchronously to one-motor EV mode (closing clutch C1 and clutch C3 while opening C2) and the engine 12 may be started as described above.

For cruising, the powertrain 10 may shift from series mode to an output-split, EVT/load-sharing mode by releasing clutch C1 and applying clutch C2. This may be implemented as a conventional clutch-to-clutch shift under load. Alternately, clutch C3 may be released to allow independent control of engine 12 and motor/generator A 60 speed during the shift. This allows the inertia and torque of motor/generator A 60 to react motor/generator B 62 torque during the shift without requiring engine speed to decrease, increasing output torque.

In EVT/load-sharing mode, the powertrain 10 operates as an output-split mode. Motor/generator A 60 generates a portion of the engine torque which is transmitted to motor/generator B 62. The powertrain 10 has a mechanical point at the ratio where motor/generator B 62 speed is zero. For ratios below this value, power flow will be in the forward direction. Since the system is an output-split mode, the engine 12 and motor torque may be combined additively at ratios below the mechanical point. For example, at a 1:1 transmission ratio, the motor/generator and engine speeds are all equal to the output speed, and motor/generator A 60, motor/generator B 62, and the engine power can be combined to provide high vehicle performance. Load-sharing is a high range output-split mode usable at high vehicle speeds or light loads.

The powertrain 10 can easily transition to engine-off one-motor EV mode from series mode simply by reducing the engine speed to zero in a controlled fashion using motor/generator A 60 as a generator. The powertrain 10 can also transition from load-sharing mode to engine-off one-motor EV mode by changing synchronously to the appropriate ratio, and then opening clutch C2 and closing clutch C1.

Various embodiments of powertrains with transmissions are described herein. For each of the powertrains shown and described, the various modes are accomplished according to the clutch engagement schedule of Table I, with corresponding components functioning as described with respect to powertrain 10 of FIG. 1. The various embodiments offer one or more distinct advantages over previous electrically-variable transmissions, and are especially suited for extended range in electric-only mode. Various features of the embodiments described herein are summarized in Table II below, with the embodiments to which the features correspond indicated in each column. The features are described generally following Table II, and more specifically with respect to the embodiments to which they correspond.

TABLE II

Figure 4:
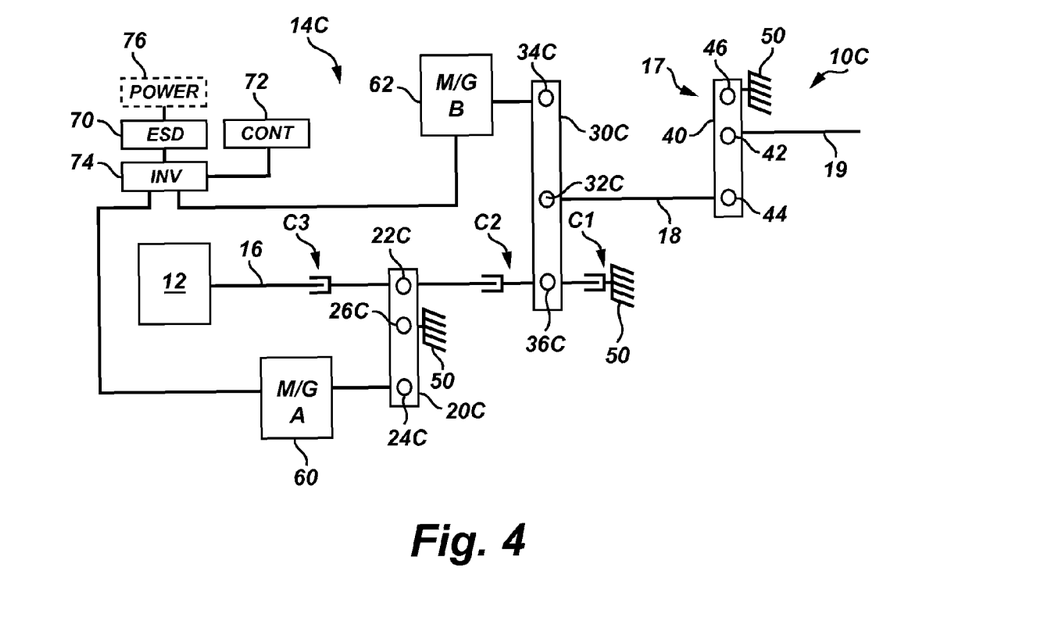
FIG. 4 is a schematic illustration of a second embodiment of an electrically-variable transmission in lever diagram form.
Figure 5:
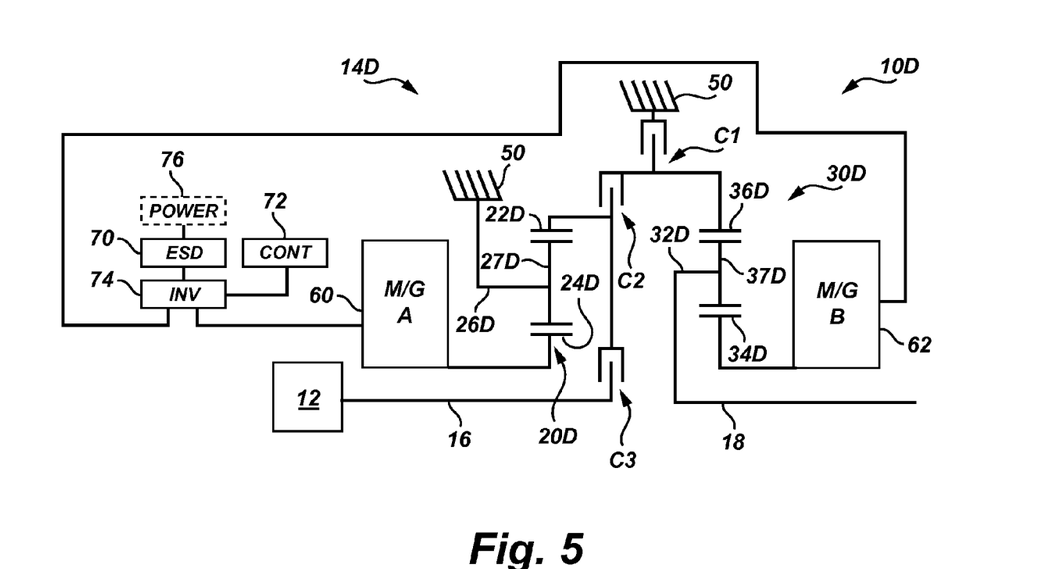
FIG. 5 is a schematic illustration of a first variation of the electrically-variable transmission of FIG. 4 in a first stick-diagram form.
Figure 6:
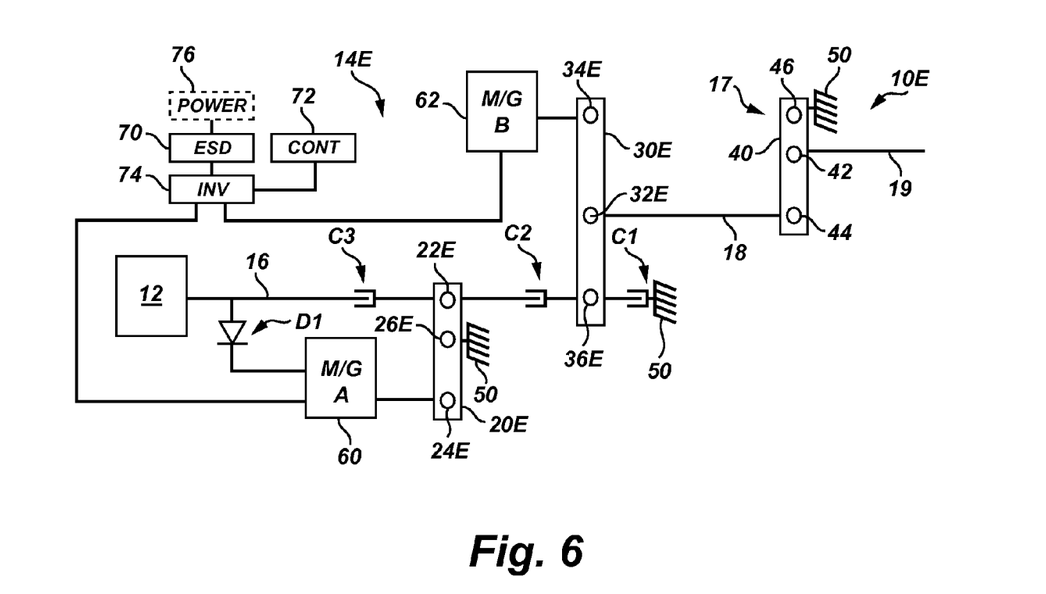
FIG. 6 is a schematic illustration of a third embodiment of an electrically-variable transmission in lever diagram form.
Figure 7:
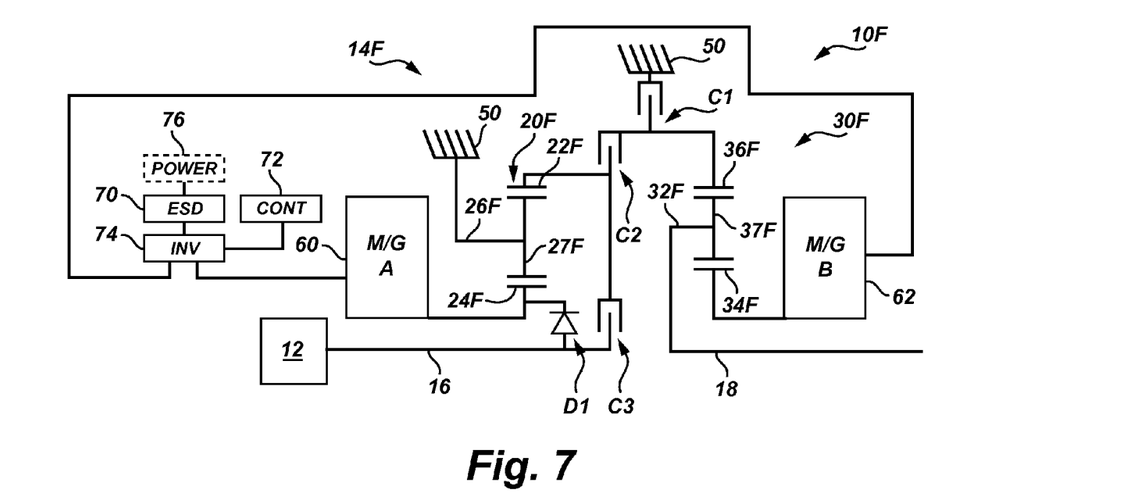
FIG. 7 is a schematic illustration of a first variation of the electrically-variable transmission of FIG. 6 in a first stick-diagram form.
Figure 8:
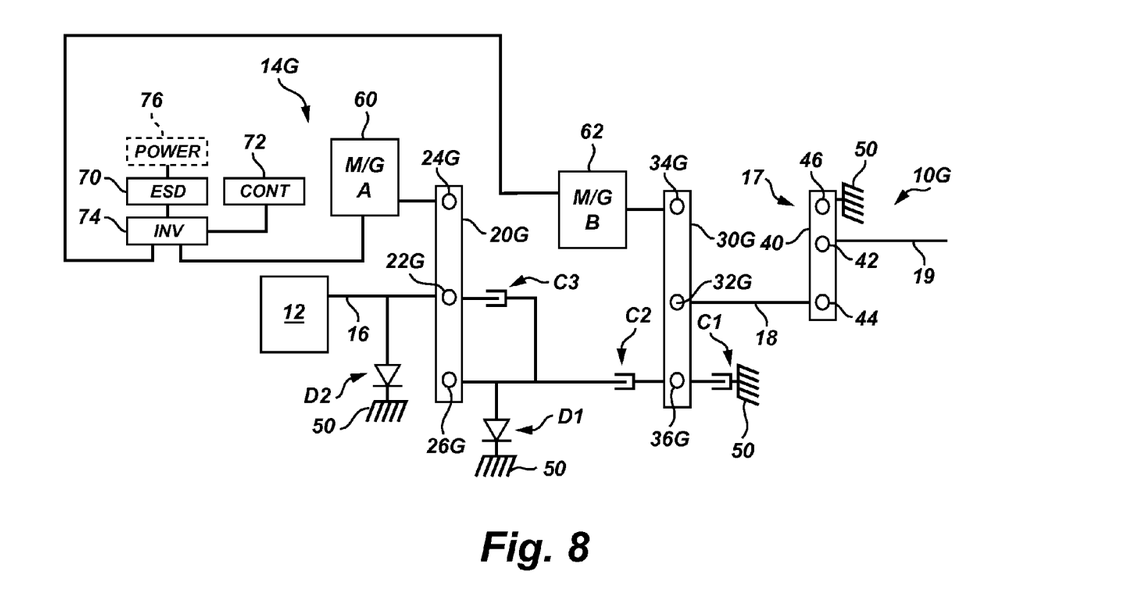
FIG. 8 is a schematic illustration of a fourth embodiment of an electrically-variable transmission in lever diagram form.
Figure 9:
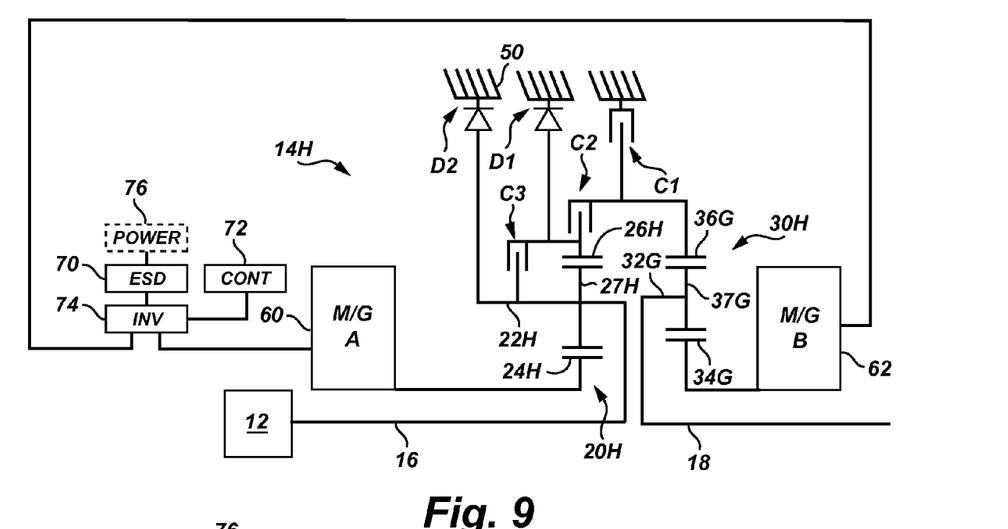
FIG. 9 is a schematic illustration of a first variation of the electrically-variable transmission of FIG. 8 in a first stick-diagram form.
Figure 10:
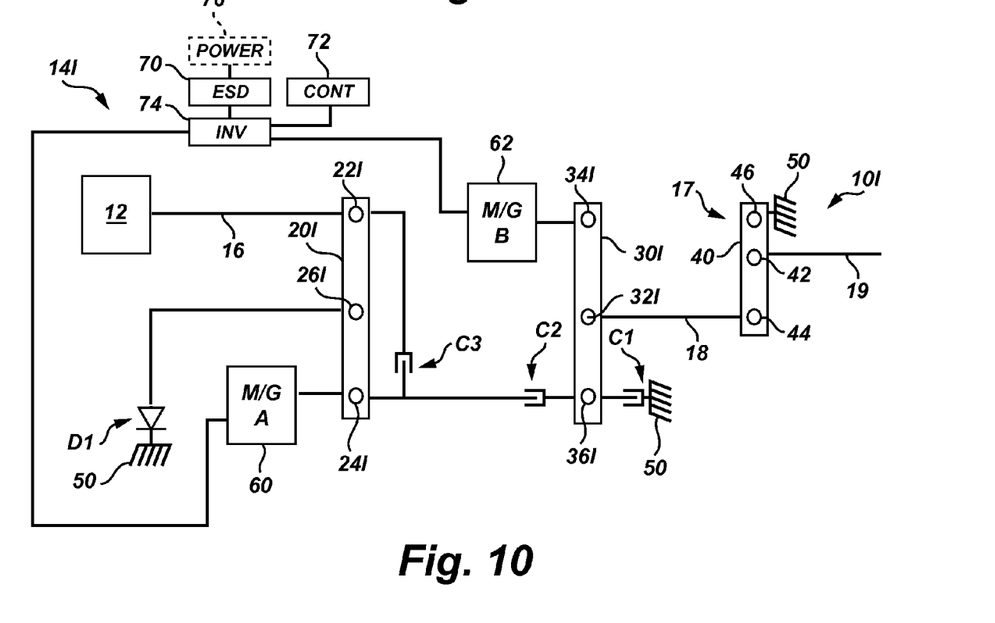
FIG. 10 is a schematic illustration of a fifth embodiment of an electrically-variable transmission in lever diagram form.
Figure 11:
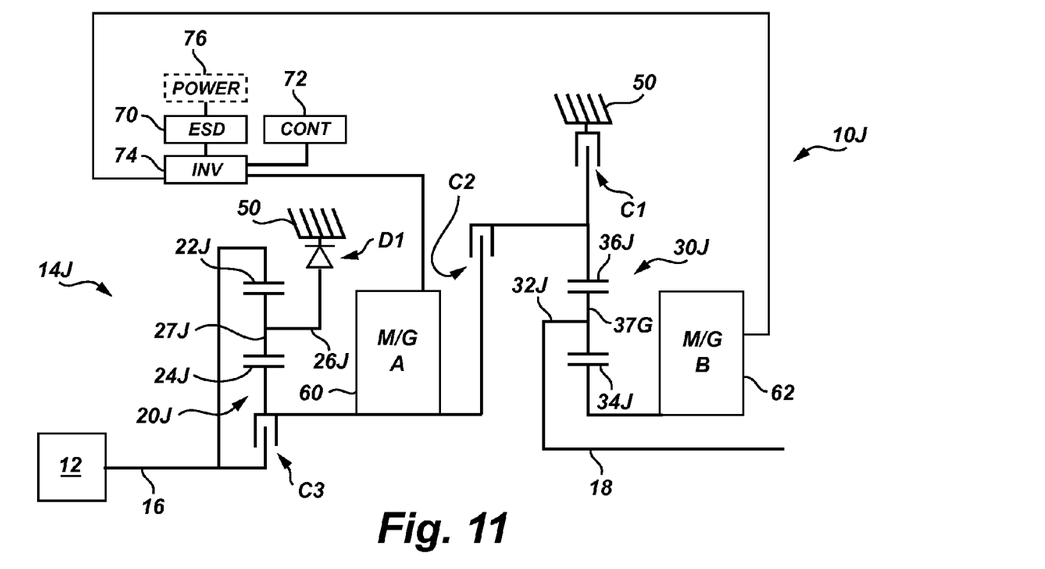
FIG. 11 is a schematic illustration of a first variation of the electrically-variable transmission of FIG. 10 in a first stick-diagram form.
Figure 12:
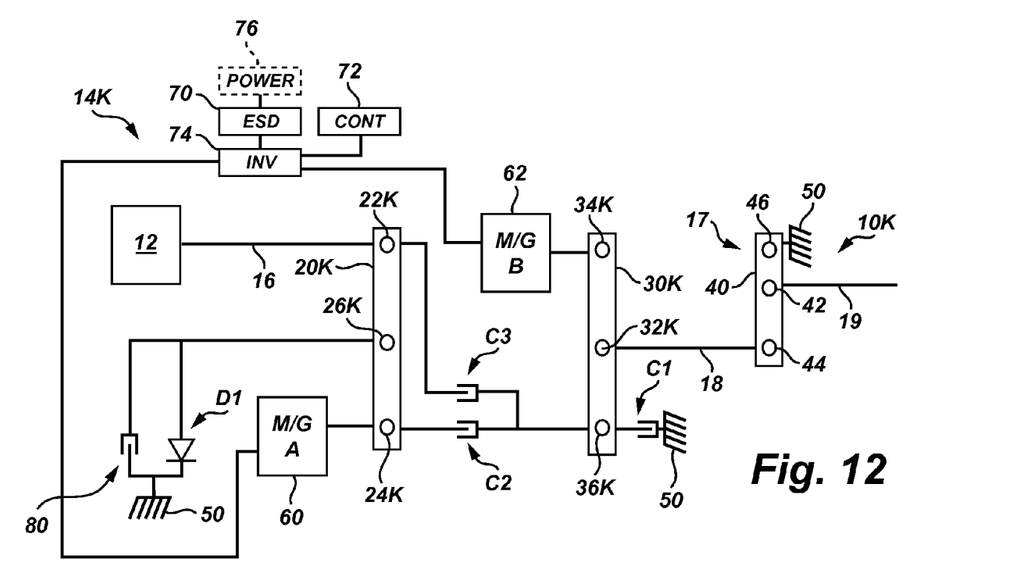
FIG. 12 is a schematic illustration of a sixth embodiment of an electrically-variable transmission in lever diagram form.
Figure 13:
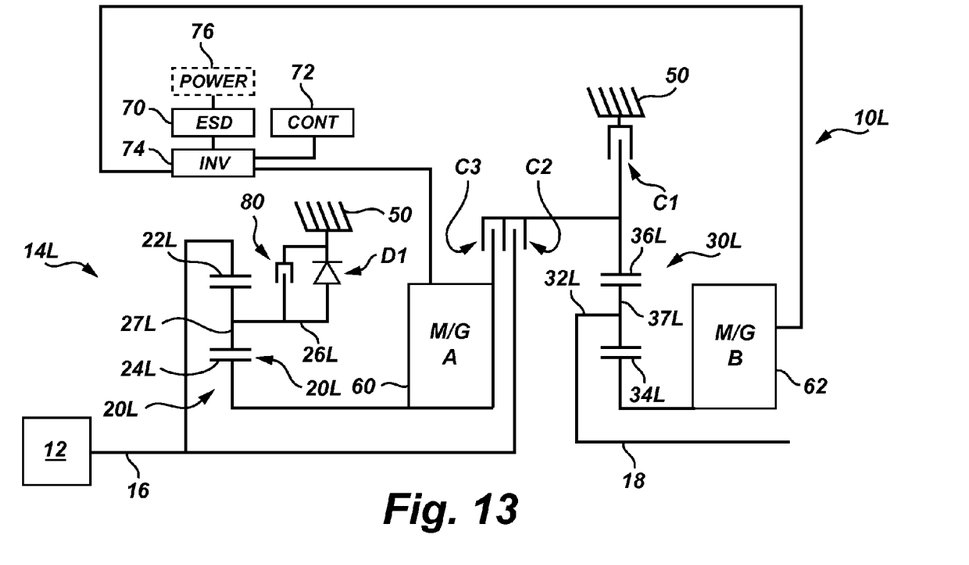
FIG. 13 is a schematic illustration of a first variation of the electrically-variable transmission of FIG. 12 in a first stick-diagram form.
Figure 14:
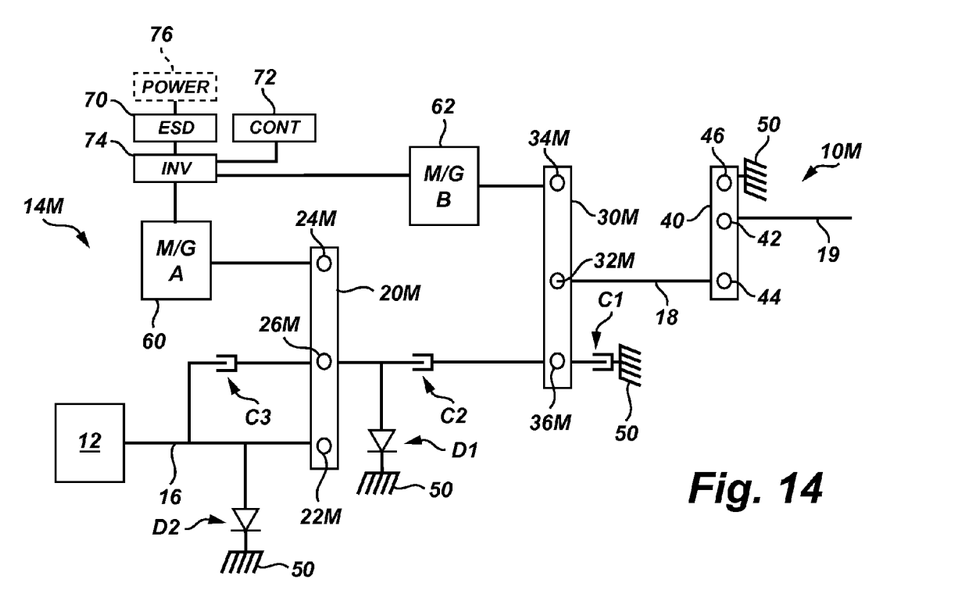
FIG. 14 is a schematic illustration of a seventh embodiment of an electrically-variable transmission in lever diagram form.
Figure 15:
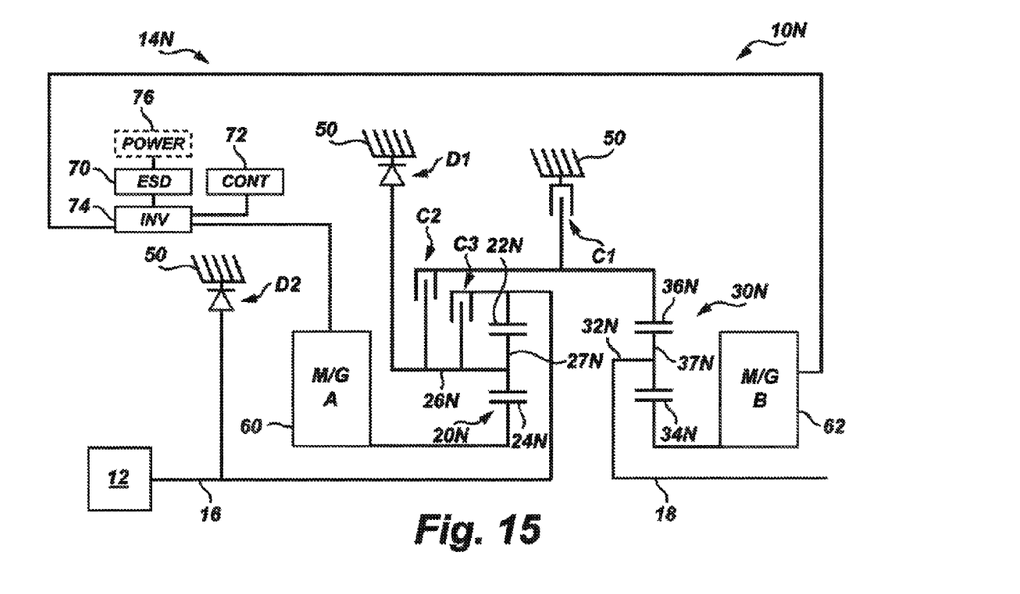
FIG. 15 is a schematic illustration of a first variation of the electrically-variable transmission of FIG. 14 in a first stick-diagram form.
Figure 16:
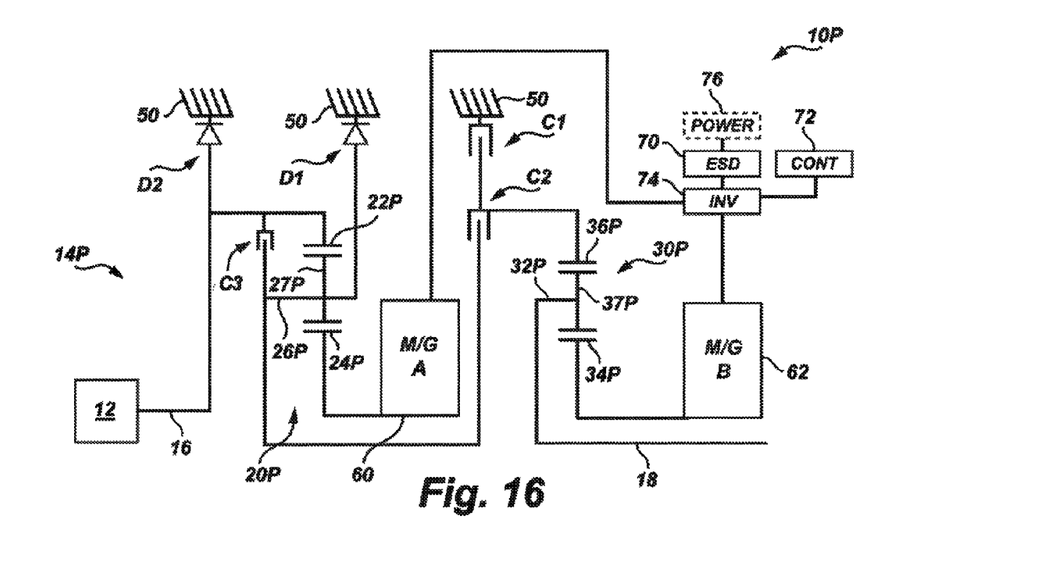
FIG. 16 is a schematic illustration of a second variation of the electrically-variable transmission of FIG. 14 in a second stick-diagram form.

| | Embodiment | | | | | |
|---|---|---|---|---|---|---|
| Feature | FIGS. 1-5 | FIGS. 6-7 | FIGS. 8-9 | FIGS. 10-11 | FIGS. 12-13 | FIGS. 14-16 |
| Cold start without clutch closure | | X | X | X | X | X |
| Motor/generator A ratio during series mode | X | X | X | | X | X |
| Motor/generator A ratio during two-motor EV mode | X | X | X | | | X |
| Motor/generator A ratio during cold start | X | | X | X | X | X |
| Motor/generator A ratio during Load-sharing/increased tractive capability | X | X | | | X | |
| Uninterrupted generating capability on Motor/generator A during shifts | | | | X | | X |

Cold Start without Clutch Closure

In general, it is more difficult to design a hydraulic clutch system to generate pressure to apply a clutch under cold ambient temperature conditions. Due to the increased transmission fluid viscosity, a large auxiliary pump may be required in order to provide this functionality. In addition, there may be significant delay in order to develop the required pressure and flow to apply the clutch. If the system is capable of starting without clutch closure, hydraulic requirements can be reduced, which can reduce the cost and mass of the auxiliary pump.

Motor/Generator A Ratio During Series Mode

If motor/generator A 60 is geared to the engine with a ratio greater than one, the speed of motor/generator A 60 will be increased and the torque reduced. This can enable more efficient operation of motor/generator A 60 and can lower the torque requirement of motor/generator A 60, which could enable reduction in motor size.

Motor/Generator A Ratio During Two-Motor EV Mode

If motor/generator A 60 is geared with a ratio during two-motor EV operation, the tractive capability of the mode is increased for a given motor/generator A 60 torque since motor/generator A 60 torque is the limiting constraint when in this mode of operation.

Motor/Generator A Ratio During Cold Start

If motor/generator A 60 is geared with a gear ratio with a magnitude greater than one during cold starting of the engine 12, the battery power to start the engine 12 will be reduced because the motor losses are proportional to the square of motor torque.

Motor/Generator A Ratio During Load-Sharing/Increased Tractive Capability

If motor/generator A 60 is geared with a ratio during load-sharing operation, the tractive capability of the mode is increased for a given motor/generator A 60 torque since the sum of motor/generator A 60 torque and engine torque is the limiting constraint when in this mode of operation.

Uninterrupted Generating Capability on Motor/Generator A During Shifts

In some hybrid powertrain designs, in order to shift from load-sharing to series mode, the motor/generator A 60 must be disconnected from the engine 12 momentarily during the shift, or clutch C2 must be slipped in order to maintain reaction torque and provide output torque. Both of these actions compromise the ability of the system to operate in a power-balanced state during the shift which can cause a torque sag during downshifts if battery power is limited (i.e. due to cold battery temperature). In some of the proposed embodiments (FIGS. 8-9 and FIGS. 14-16, i.e., embodiments with one-way clutch D2), the powertrain 10 can transmit power continuously through the electrical path during the shift maneuver, eliminating the torque sag during the shift.

Figure 2:
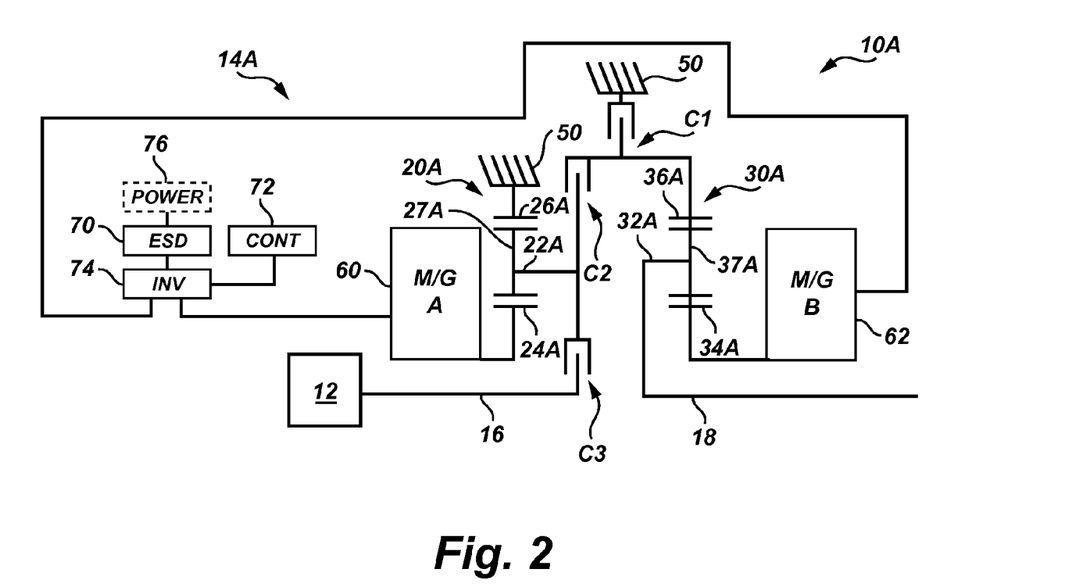
FIG. 2 is a schematic illustration of a first variation of the electrically-variable transmission of FIG. 1 in a first stick-diagram form.

A stick-diagram embodiment of the powertrain 10 is shown as powertrain 10A in FIG. 2. In this embodiment, motor/generator A 60 is geared at a ratio to the engine 12 to reduce the torque requirement. Transmission 14A includes planetary gear set 20A, which corresponds with planetary gear set 20, and has a first member 22A that is a carrier member, a second member 24A that is a sun gear member, and a third member 26A that is a ring gear member. The first member 22A supports pinion gears 27A that mesh with the second member 24A and the third member 26A. Planetary gear set 30A corresponds with planetary gear set 30, and has a first member 32A that is a carrier member, a second member 34A that is a sun gear member, and a third member 36A that is a ring gear member. The first member 32A supports pinion gears 37A that mesh with the second member 34A and the third member 36A. A final drive planetary gear set corresponding with planetary gear set 40 of FIG. 1 may be employed, but is not shown.

Figure 3:
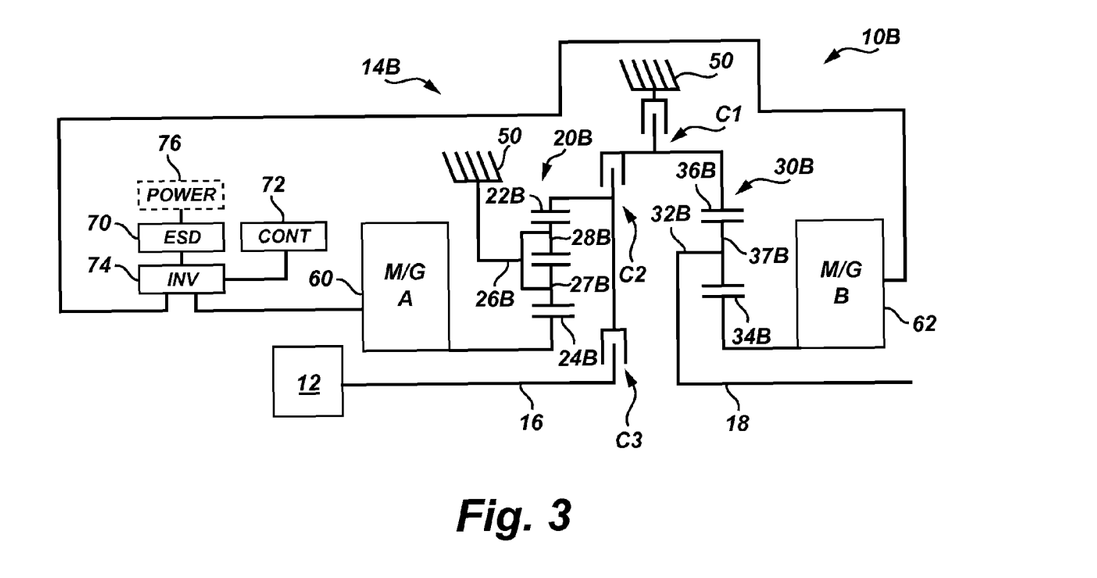
FIG. 3 is a schematic illustration of the electrically-variable transmission of FIG. 1 in a second stick-diagram form.

A stick-diagram embodiment of the powertrain 10 is shown as powertrain 10B in FIG. 3, wherein transmission 14B includes planetary gear set 20B, which is a compound gear set with a first member 22B that is a ring gear member, a second member 24B that is a sun gear member, and a third member 26B that is a carrier member. Two sets of pinion gears 27B, 28B are supported for rotation on the carrier member 26B, with pinion gears 27B meshing with the sun gear member 24B and the pinion gears 28B, and pinion gears 28B meshing with the ring gear member 22B and the pinion gears 27B. Planetary gear set 30B corresponds with planetary gear set 30, and has a first member 32B that is a carrier member, a second member 34B that is a sun gear member, and a third member 36B that is a ring gear member. The first member 32B supports pinion gears 37B that mesh with the second member 34B and the third member 36B. A final drive planetary gear set corresponding with planetary gear set 40 of FIG. 1 may be employed, but is not shown.

FIG. 4 shows a lever diagram and FIG. 5 shows a corresponding stick-diagram for another embodiment of a powertrain within the scope of the claimed invention. Referring to FIG. 4, powertrain 10C includes transmission 14C that has a different connection of motor/generator A 60 to the planetary gear set 20C to implement the motor/generator A gear ratio (i.e., the ratio between motor/generator A 60 and the engine 12). Transmission 14C includes a first planetary gear set 20C represented as a three-node lever having a first member 22C, a second member 24C, and a third member 26C, which are represented as nodes. A second planetary gear set 30C is represented as a three-node lever having a first member 32C, a second member 34C, and a third member 36C, which are represented as nodes.

A stick-diagram embodiment of the powertrain 10C is shown as powertrain 10D in FIG. 5. Transmission 14D includes planetary gear set 20D that corresponds with planetary gear set 20C, and has a first member 22D that is a ring gear member, a second member 24D that is a sun gear member, and a third member 26D that is a carrier member. The third member 26D supports pinion gears 27D that mesh with the second member 24D and the first member 22D. Planetary gear set 30D corresponds with planetary gear set 30C, and has a first member 32D that is a carrier member, a second member 34D that is a sun gear member, and a third member 36D that is a ring gear member. The first member 32D supports pinion gears 37D that mesh with the second member 34D and the third member 36D. A final drive planetary gear set corresponding with planetary gear set 40 of FIG. 4 may be employed, but is not shown.

FIG. 6 shows a lever diagram and FIG. 7 shows a corresponding stick-diagram for another embodiment of a powertrain within the scope of the claimed invention. Referring to FIG. 6, powertrain 10E is similar to powertrain 10C of FIG. 4, except that a one-way clutch D1 is added to allow cold starting without requiring any of the other clutches C1, C2 and C3 to be closed. Powertrain 10E includes transmission 14E that has a first planetary gear set 20E represented as a three-node lever having a first member 22E, a second member 24E, and a third member 26E, which are represented as nodes. A second planetary gear set 30E is represented as a three-node lever having a first member 32E, a second member 34E, and a third member 36E, which are represented as nodes. One-way clutch D1 engages when motor/generator A 60 spins faster than input member 16 in a direction corresponding with forward rotation of input member 16 but overruns when input member 16 rotates faster than motor/generator A 60. Accordingly, motor/generator A can be used to start the engine 12 by rotating the input member 16, and attached engine output member connected thereto, through the one-way clutch D1.

A stick-diagram embodiment of the powertrain 10E is shown as powertrain 10F in FIG. 7. Transmission 14F includes planetary gear set 20F corresponding with planetary gear set 20E, and has a first member 22F that is a ring gear member, a second member 24F that is a sun gear member, and a third member 26F that is a carrier gear member. The third member 26F supports pinion gears 27F that mesh with the second member 24F and the first member 22F. Planetary gear set 30F corresponds with planetary gear set 30E, and has a first member 32F that is a carrier member, a second member 34F that is a sun gear member, and a third member 36F that is a ring gear member. The first member 32F supports pinion gears 37F that mesh with the second member 34F and the third member 36F. A final drive planetary gear set corresponding with planetary gear set 40 of FIG. 6 may be employed, but is not shown.

FIG. 8 shows a lever diagram and FIG. 9 shows a corresponding stick-diagram for another embodiment of a powertrain within the scope of the claimed invention. In this embodiment, two one-way clutches are added. As described above, one-way clutch D1 allows the engine 12 to be started without requiring any other clutches to be closed. A second one-way clutch D2 provides a reaction point allowing motor/generator A 60 to provide reaction torque during operation in two-motor EV mode. Referring to FIG. 8, powertrain 10G includes transmission 14G that has a first planetary gear set 20G represented as a three-node lever having a first member 22G, a second member 24G, and a third member 26G, which are represented as nodes. A second planetary gear set 30G is represented as a three-node lever having a first member 32G, a second member 34G, and a third member 36G, which are represented as nodes. One-way clutch D1 engages when motor/generator A 60 spins at at least a given ratio to first member 22G, thereby grounding member 26G and providing a reaction point to allow the engine 12 to be started via node 22G, with a ratio between nodes 24G and 22G. One-way clutch D1 overruns when motor/generator A 60 is not spinning at the ratio required to ground member 26G. One-way clutch D2 grounds first member 22G to the stationary member 50 when motor/generator A 60 is controlled to provide power along with motor/generator B 62 with clutch C2 closed in the two-motor EV mode and with engine 12 off.

A stick-diagram embodiment of the powertrain 10G is shown as powertrain 10H in FIG. 9. Transmission 14H includes planetary gear set 20H corresponding with planetary gear set 20G, and has a first member 22H that is a carrier member, a second member 24H that is a sun gear member, and a third member 26H that is a ring gear member. The first member 22H supports pinion gears 27H that mesh with the second member 24H and the third member 26H. Planetary gear set 30H corresponds with planetary gear set 30G, and has a first member 32G that is a carrier member, a second member 34G that is a sun gear member, and a third member 36G that is a ring gear member. The first member 32G supports pinion gears 37G that mesh with the second member 34G and the third member 36G. A final drive planetary gear set corresponding with planetary gear set 40 of FIG. 8 may be employed, but is not shown.

FIG. 10 shows a lever diagram and FIG. 11 shows a corresponding stick-diagram for another embodiment of a powertrain within the scope of the claimed invention. This embodiment includes one-way clutch D1 that allows the engine 12 to be started without requiring any of the other clutches C1, C2, or C3 to be closed, as described above. Referring to FIG. 10, powertrain 10I includes transmission 14I that has a first planetary gear set 20I represented as a three-node lever having a first member 22I, a second member 24I, and a third member 26I, which are represented as nodes. A second planetary gear set 30I is represented as a three-node lever having a first member 32I, a second member 34I, and a third member 36I, which are represented as nodes. One-way clutch D1 engages when motor/generator A 60 spins at at least a given negative ratio to first member 22I, thereby grounding member 26I and providing a reaction point to allow the engine 12 to be started via node 22I, with a ratio between nodes 24I and 22I. One-way clutch D1 overruns when motor/generator A 60 is not spinning at the ratio required to ground member 26I. The gear ratio between the M/G A 60 and first member 22I is active only during engine starting, and the clutch C3 is closed with engine 12 on in the load-sharing, EVT output-split mode.

A stick-diagram embodiment of the powertrain 10I is shown as powertrain 10J in FIG. 11. Transmission 14J includes planetary gear set 20J that corresponds with planetary gear set 20I, and has a first member 22J that is a ring gear member, a second member 24J that is a sun gear member, and a third member 26J that is a carrier member. The third member 26J supports pinion gears 27J that mesh with the second member 24J and the first member 22J. Planetary gear set 30J corresponds with planetary gear set 30I, and has a first member 32J that is a carrier member, a second member 34J that is a sun gear member, and a third member 36J that is a ring gear member. The first member 32J supports pinion gears 37J that mesh with the second member 34J and the third member 36J.

A final drive planetary gear set corresponding with planetary gear set 40 of FIG. 10 may be employed, but is not shown.

TABLE II

| Additional Clutch 80/ D1 | Clutch C1 | Clutch C2 | Clutch C3 | Mode |
|---|---|---|---|---|
| X | X |   | X | One-motor electric-only (EV) (engine off) |
|   |   | X | X | EVT/Load-sharing (output-split) |
| X |   |   | X | EVT/Load-sharing (output-split) |
| X | X |   |   | Series (engine on) |
|   |   |   |   | Neutral |
| X |   |   |   | Neutral with Battery Charge |
|   |   | X |   | Two-motor electric-only (EV) |

FIG. 12 shows a lever diagram and FIG. 13 shows a corresponding stick-diagram for another embodiment of a powertrain within the scope of the claimed invention. These embodiments are operable according to the clutch engagement schedule of Table II along with control of the motor/generators 60, 62 and the on or off state of the engine 12 to provide seven operating modes. In this embodiment, one-way clutch D1 allows the engine 12 to be started without requiring any of the other clutches C1, C2, C3 to be closed, as described above. Referring to FIG. 12, powertrain 10K includes transmission 14K that has a first planetary gear set 20K represented as a three-node lever having a first member 22K, a second member 24K, and a third member 26K, which are represented as nodes. A second planetary gear set 30K is represented as a three-node lever having a first member 32K, a second member 34K, and a third member 36K, which are represented as nodes. One-way clutch D1 engages when motor/generator A 60 spins at at least a given negative ratio to first member 22K thereby grounding member 26K and providing a reaction point to allow the engine 12 to be started via node 22K, with a ratio between nodes 24K and 22K. One-way clutch D1 overruns when motor/generator A 60 is not spinning at the ratio required to ground member 26K. With clutch C2 open, the gear ratio between member 22K and member 24K can be active during starting or while driving in load-sharing mode (EVT output-split mode) with motor/generator A 60 motoring. Alternately, the powertrain 10K can operate with a 1:1 ratio between engine 12 and motor/generator A 60 in load-sharing mode as well, with clutches C2 and C3 engaged. An optional selectively lockable friction or dog clutch 80 is added to one-way clutch D1 to selectively lock member 26K to stationary member 50, enabling a series mode in powertrain 10K, i.e., to provide reaction torque on member 26K when the engine 12 drives motor/generator A 60 acting as a generator to provide power to the ESD 70, which in turn powers the motor/generator B 62.

A stick-diagram embodiment of the powertrain 10K is shown as powertrain 10L in FIG. 13. Transmission 14L includes planetary gear set 20L that corresponds with planetary gear set 20K, and has a first member 22L that is a ring gear member, a second member 24L that is a sun gear member, and a third member 26L that is a carrier member. The third member 26L supports pinion gears 27L that mesh with the second member 24L and the first member 22L. Planetary gear set 30L corresponds with planetary gear set 30K, and has a first member 32L that is a carrier member, a second member 34L that is a sun gear member, and a third member 36L that is a ring gear member. The first member 32L supports pinion gears 37L that mesh with the second member 34L and the third member 36L. A final drive planetary gear set corresponding with planetary gear set 40 of FIG. 12 may be employed, but is not shown.

FIG. 14 shows a lever diagram and FIGS. 15 and 16 show two possible corresponding stick-diagrams for another embodiment of a powertrain within the scope of the claimed invention. One-way clutch (D1) allows the engine 12 to be started without engaging any of the other clutches C1, C2, or C3, as described above. The second one-way clutch D2 allows motor/generator A 60 to provide reaction torque during two-motor EV drive mode. The powertrains 10M, 10N and 10P allow for shifting between series mode and load-sharing, output-split EVT mode (by opening C1 and closing C2 while C3 remains engaged) without requiring asynchronous shifts or requiring disconnection of motor/generator A 60 from the engine 12, which provides improved operation at low battery conditions. Referring to FIG. 14, powertrain 10M includes transmission 14M that has a first planetary gear set 20M represented as a three-node lever having a first member 22M, a second member 24M, and a third member 26M, which are represented as nodes. A second planetary gear set 30M is represented as a three-node lever having a first member 32M, a second member 34M, and a third member 36M, which are represented as nodes. One-way clutch D1 engages when motor/generator A 60 spins at at least a given negative ratio to first member 22M, thereby grounding member 26M and providing a reaction point to allow the engine 12 to be started via node 22M, with a ratio between nodes 24M and 22M. One-way clutch D1 overruns when motor/generator A 60 is not spinning at the ratio required to ground member 26M. The gear ratio between the M/G A 60 and first member 22M is active only during engine starting. The gear ratio between member 24M and member 26M is active during driving in two motor EV mode with motor/generator A 60 motoring. The powertrain 10M operates with a 1:1 ratio between engine 12 and motor/generator A 60 in load-sharing, EVT output-split mode, with clutches C2 and C3 engaged.

A stick-diagram embodiment of the powertrain 10M is shown as powertrain 10N in FIG. 15. Transmission 14N includes planetary gear set 20N that corresponds with planetary gear set 20M, and has a first member 22N that is a ring gear member, a second member 24N that is a sun gear member, and a third member 26N that is a carrier member. The third member 26N supports pinion gears 27N that mesh with the first member 22N and the second member 24N. Planetary gear set 30N corresponds with planetary gear set 30M, and has a first member 32N that is a carrier member, a second member 34N that is a sun gear member, and a third member 36N that is a ring gear member. The first member 32N supports pinion gears 37N that mesh with the second member 34N and the third member 36N. A final drive planetary gear set corresponding with planetary gear set 40 of FIG. 12 may be employed, but is not shown.

A stick-diagram embodiment of the powertrain 10M is shown as powertrain 10P in FIG. 16. Transmission 14P includes planetary gear set 20P that corresponds with planetary gear set 20M, and has a first member 22P that is a ring gear member, a second member 24P that is a sun gear member, and a third member 26P that is a carrier member. The third member 26P supports pinion gears 27P that mesh with the first member 22P and the third member 24P. Planetary gear set 30P corresponds with planetary gear set 30M, and has a first member 32P that is a carrier member, a second member 34P that is a sun gear member, and a third member 36P that is a ring gear member. The first member 32P supports pinion gears 37P that mesh with the second member 34P and the third member 36P. A final drive planetary gear set corresponding with planetary gear set 40 of FIG. 12 may be employed, but is not shown.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission for use with an engine, comprising:
   an input member configured for operative interconnection with the engine;
   an output member;
   a stationary member;
   first and second motor/generators;
   a first and a second planetary gear set each having respective first, second, and third members; wherein the first member of the first planetary gear set is a ring gear member, the second member of the first planetary gear set is a sun gear member, and the third member of the first planetary gear set is a carrier member;
   wherein the first motor/generator is positioned axially between the planetary gear sets;
   a first, a second, and a third selectively engagable torque-transmitting mechanism;
   wherein said input member is connected for common rotation with the first member of the first planetary gear set; wherein the output member is connected for common rotation with the first member of the second planetary gear set;
   wherein the first motor/generator is connected for common rotation with the second member of the first planetary gear set; wherein the second motor/generator is connected for common rotation of the second member of the second planetary gear set;
   wherein the third member of the first planetary gear set is grounded to the stationary member in at least one direction of rotation via a first one-way clutch; wherein the third member of the second planetary gear set is selectively grounded to the stationary member by engagement of the first torque-transmitting mechanism; wherein the third member of the second planetary gear set is selectively connectable for common rotation with one of the members of the first planetary gear set by engagement of the second torque-transmitting mechanism; wherein the third member of the first planetary gear set is selectively connectable for common rotation with the input member by engagement of the third torque-transmitting mechanism;
   wherein the motor/generators are controllable and the torque-transmitting mechanisms are selectively engagable to establish at least one electric-only mode, a series mode, an output-split mode, and at least one neutral mode;
   wherein the first one-way clutch grounds the third member of the first planetary gear set to the stationary member in one direction of rotation; wherein the first one-way clutch provides reaction torque for the third member of the first planetary gear set to enable the first motor/generator to start the engine without engaging any of the torque-transmitting mechanisms when the first motor/generator spins in a forward direction;
   wherein the at least one electric-only mode includes a two-motor electric-only mode;
   a second one-way clutch configured to provide reaction torque to the first member of the first planetary gear set when the second torque-transmitting mechanism is engaged and both motor/generators are providing torque in the two-motor electric-only mode;
wherein the third torque-transmitting mechanism is positioned axially between the second one-way clutch and the first planetary gear set; wherein the first planetary gear set is positioned axially between the third torque-transmitting mechanism and the first one-way clutch; wherein the first one-way clutch is positioned axially between the first planetary gear set and the first motor/generator; wherein the first torque-transmitting mechanism is radially stacked with the second torque-transmitting mechanism and is positioned axially between the first motor/generator and the second planetary gear set; and wherein the second planetary gear set is positioned axially between the second torque-transmitting mechanism and the second motor/generator.

2. The electrically-variable transmission of claim 1, wherein the first motor/generator is geared to the engine with a gear ratio with a magnitude greater than one through the first planetary gear set during start of the engine.

3. The electrically-variable transmission of claim 1, wherein the first motor/generator is geared to the engine with a gear ratio with a magnitude greater than one through the first planetary gear set during at least one of said at least one electric-only mode, the series mode, the output-split mode, and the at least one neutral mode.

4. The electrically-variable transmission of claim 1, wherein the first and third torque-transmitting mechanisms are engaged, the second torque-transmitting mechanism is not engaged and electric power is provided by the second motor/generator to establish the at least one electric mode when the engine is off and to establish the series mode when the engine is on.

5. The electrically-variable transmission of claim 1, wherein the second and third torque-transmitting mechanisms are engaged and the first torque-transmitting mechanism is not engaged to establish the output-split mode.

6. The electrically-variable transmission of claim 1, further comprising:
an energy storage device connected to the motor/generators for providing energy thereto or receiving energy therefrom; wherein the third torque-transmitting mechanism is engaged, and the first and second torque-transmitting mechanisms are not engaged to establish the at least one neutral mode in which the first motor/generator functions as a generator driven by the engine to charge the energy storage device.

7. The electrically-variable transmission of claim 1, wherein shifting between the series mode and the output-split mode is synchronous, with the third torque-transmitting mechanism remaining engaged so that the first motor/generator remains operatively connected with the engine.

8. An electrically-variable transmission for use with an engine, comprising:
an input member configured for operative interconnection with the engine;
an output member;
a stationary member;
first and second motor/generators;
a first and a second planetary gear set each having respective first, second, and third members; wherein each of the motor/generators is connected to a different one of the planetary gear sets and the input member and the output member are selectively or continuously connected to one of the members of the first planetary gear set and one of the members of the second planetary gear set, respectively; wherein the first member of the first planetary gear set is a ring gear member, the second member of the first planetary gear set is a sun gear member, and the third member of the first planetary gear set is a carrier member;
wherein the first motor/generator is positioned axially between the planetary gear sets;
a first, a second, and a third torque-transmitting mechanism selectively engagable to connect at least some of the members of the planetary gear sets with one of the stationary member, the input member, or another of the members of the planetary gear sets;
a first one-way clutch operatively connected to the first motor/generator to allow the first motor/generator to start the engine when none of the torque-transmitting mechanisms are engaged;
wherein the motor/generators are controllable and the torque-transmitting mechanisms are selectively engagable in different combinations to establish a one-motor electric-only mode, a two-motor electric-only mode, a series mode, an output-split mode, and at least one neutral mode;
a second one-way clutch grounded to the stationary member to provide reaction torque to the member of the first planetary gear set connected with the input member during the two-motor electric-only mode, thereby allowing the first motor/generator to provide reaction torque;
wherein the third torque-transmitting mechanism is positioned axially between the second one-way clutch and the first planetary gear set; wherein the first planetary gear set is positioned axially between the third torque-transmitting mechanism and the first one-way clutch; wherein the first one-way clutch is positioned axially between the first planetary gear set and the first motor/generator; wherein the first torque-transmitting mechanism is radially stacked with the second torque-transmitting mechanism and is positioned axially between the first motor/generator and the second planetary gear set; and wherein the second planetary gear set is positioned axially between the second torque-transmitting mechanism and the second motor/generator.

9. The electrically-variable transmission of claim 7, wherein the first planetary gear set provides a gear ratio with a magnitude greater than one between the first motor/generator and the engine.

10. An electrically-variable transmission for use with an engine, comprising:
an input member configured for operative interconnection with the engine;
an output member;
a stationary member;
first and second motor/generators;
a first and a second planetary gear set each having respective first, second, and third members; wherein each of the motor/generators is connected to a different one of the planetary gear sets and the input member and the output member are selectively or continuously connected to one of the members of the first planetary gear set and one of the members of the second planetary gear set, respectively;
wherein the first member of the first planetary gear set is a ring gear member, the second member of the first planetary gear set is a sun gear member, and the third member of the first planetary gear set is a carrier member;
wherein the first motor/generator is positioned axially between the planetary gear sets;

a first, a second, and a third torque-transmitting mechanism selectively engagable to connect at least some of the members of the planetary gear sets with one of the stationary member, the input member, or another of the members of the planetary gear sets;

a one-way clutch grounded to the stationary member to provide reaction torque to the member of the first planetary gear set connected with the input member during a two-motor electric-only mode, thereby allowing the first motor/generator to provide reaction torque;

wherein the motor/generators are controllable and the torque-transmitting mechanisms are selectively engagable in different combinations to establish a one-motor electric-only mode, the two-motor electric-only mode, a series mode, an output-split mode, and at least one neutral mode, with a shift from the output-split mode to the series mode occurring without slipping of the torque-transmitting mechanisms and while the first motor/generator remains operatively connected with the engine through the first planetary gear set;

wherein the third torque-transmitting mechanism is positioned axially between the one-way clutch and the first planetary gear set; wherein the first planetary gear set is positioned axially between the third torque-transmitting mechanism and the first motor/generator; wherein the first torque-transmitting mechanism is radially stacked with the second torque-transmitting mechanism and is positioned axially between the first motor/generator and the second planetary gear set; and wherein the second planetary gear set is positioned axially between the second torque-transmitting mechanism and the second motor/generator.

11. The electrically-variable transmission of claim 1, wherein the first and second planetary gear sets are simple planetary gear sets.

12. The electrically-variable transmission of claim 1, wherein the first and second planetary gear sets are the only planetary gear sets operatively connected between the input member and the output member.

13. The electrically-variable transmission of claim 8, wherein the first and second planetary gear sets are simple planetary gear sets.

14. The electrically-variable transmission of claim 8, wherein the first and second planetary gear sets are the only planetary gear sets operatively connected between the input member and the output member.

15. The electrically-variable transmission of claim 10, wherein the first and second planetary gear sets are simple planetary gear sets.

16. The electrically-variable transmission of claim 10, wherein the first and second planetary gear sets are the only planetary gear sets operatively connected between the input member and the output member.

17. The electrically-variable transmission of claim 1, wherein the first and the second motor/generators are the only motor/generators operatively connected between the input member and the output member.

* * * * *